UNITED STATES PATENT OFFICE.

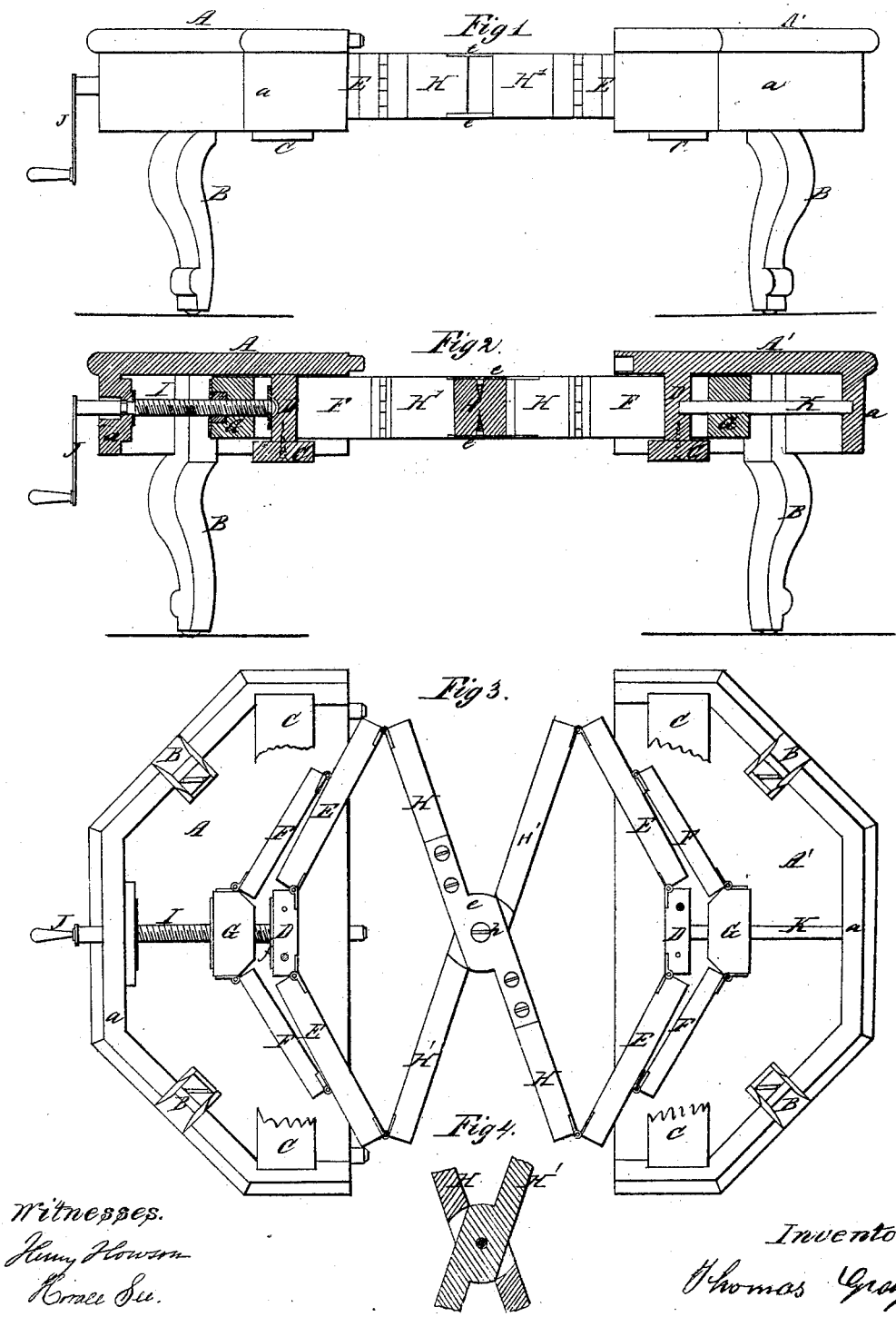

THOMAS GRAY, OF PHILADELPHIA, PENNSYLVANIA, ASSIGNOR TO HIMSELF AND JAMES M. SANKEY, OF SAME PLACE.

EXTENSION-TABLE.

Specification of Letters Patent No. 23,219, dated March 8, 1859.

*To all whom it may concern:*

Be it known that I, THOMAS GRAY, of the city and county of Philadelphia and State of Pennsylvania, have invented a new and useful Improvement in Extension-Tables; and I do hereby declare the following to be a full, clear, and exact description of the same, reference being had to the accompanying drawing and to the letters of reference marked thereon.

My invention relates to an improvement in that class of extension tables, in which are used a series of bars hinged together, and arranged to open and close; and my improvement consists in a peculiar manner, described hereafter, of connecting together the two central cross bars which form a part of the extension device, and also in a screw and certain blocks and bars in combination with the two ends of the table, the whole being arranged for joint action substantially in the manner set forth hereafter, and forming a simple, compact and readily operated device for closing and extending the said ends of the table.

In order to enable others to make and use my invention, I will now proceed to describe its construction and operation.

On reference to the accompanying drawing, which forms a part of this specification; Figure 1, is a side view of my improved extension table. Fig. 2, a longitudinal section. Fig. 3, an inverted plan. Fig. 4, a sectional view of the central joint of the extension device.

Similar letters refer to similar parts throughout the several views.

A and A' are the two ends of the extension table, supported on suitable legs B. To the opposite edges *a* of these ends is secured a cross bar C, (shown in Fig. 3 as partially broken away.) To the cross bar of each end of the table is secured a block D, and to the opposite end of each block is hinged one end of one of the bars E, the opposite end of each of the latter being hinged to one end of one of the cross bars H and H'. The latter are jointed together in the middle, in the manner shown in Figs. 3 and 4, the bar H' being made in one piece, passing between two plates *e* and *e'*, which serve to connect together the two pieces which constitute the bar H, screws *h* passing through the plates into the bar H', so as to complete the joint.

To each of the bars E is hinged another bar F, two of the latter being situated at each end of the table, and having their ends jointed to the opposite ends of a block G. At one end of the table, a screw I passes through and screws into the block G, the end of the screw being so connected by a plate *f* to the stationary block D, as to turn freely therein. The head of the screw I passes through the end of the table, and may be readily turned by a detachable handle J. At the opposite end A' of the table, the screw is dispensed with and a simple rod K introduced, this rod being attached to the edge *a* of the table at one end, and at the other end to the permanent block D, and passing freely through and serving as a guide for the block G. On turning the screw I in one direction, the blocks G at the opposite ends of the table will move toward each other, consequently, through the bars F, F, moving the two bars E at each end of the table toward each other, and opening the cross bars H and H', thereby moving the ends A and A' of the table apart, and leaving room enough between them to introduce the intermediate leaves for the desired extension, the cross bars H and H' and the bars E serving as a support for the leaves to rest upon. When the screw I is turned in a contrary direction, the blocks G, at the opposite ends of the table, will move away from each other, simultaneously drawing back the bars E, closing the cross bars H and H', and bringing the inner edges of the two ends A and A' of the table in contact with each other, when the whole forms an ordinary, unextended, center table.

I am aware that bars, so hinged together as to open and close, have been heretofore used in connection with extension tables; I do not, therefore claim broadly such a device; but

I claim and desire to secure by Letters Patent,

1. The method of constructing and of connecting together the two cross bars H and H'; that is to say, constructing one bar H in two parts and connecting the two parts together by the two plates *e* and *e'*, which admit the bar H' and afford a means of joining it to the bar H, as herein set forth.

2. The combination of the screw I, block G, bars E and F, and cross bars H and H', with the two ends of the table, the whole being arranged for joint action substantially as and for the purpose herein set forth.

In testimony whereof, I have signed my name to this specification in the presence of two subscribing witnesses.

THOMAS GRAY.

Witnesses:
HENRY HOWSON,
HORACE SEE.